July 2, 1968 C. E. JACOBY 3,390,641
TOW TRUCK CONVEYOR SYSTEM
Filed Oct. 14, 1965 3 Sheets-Sheet 3

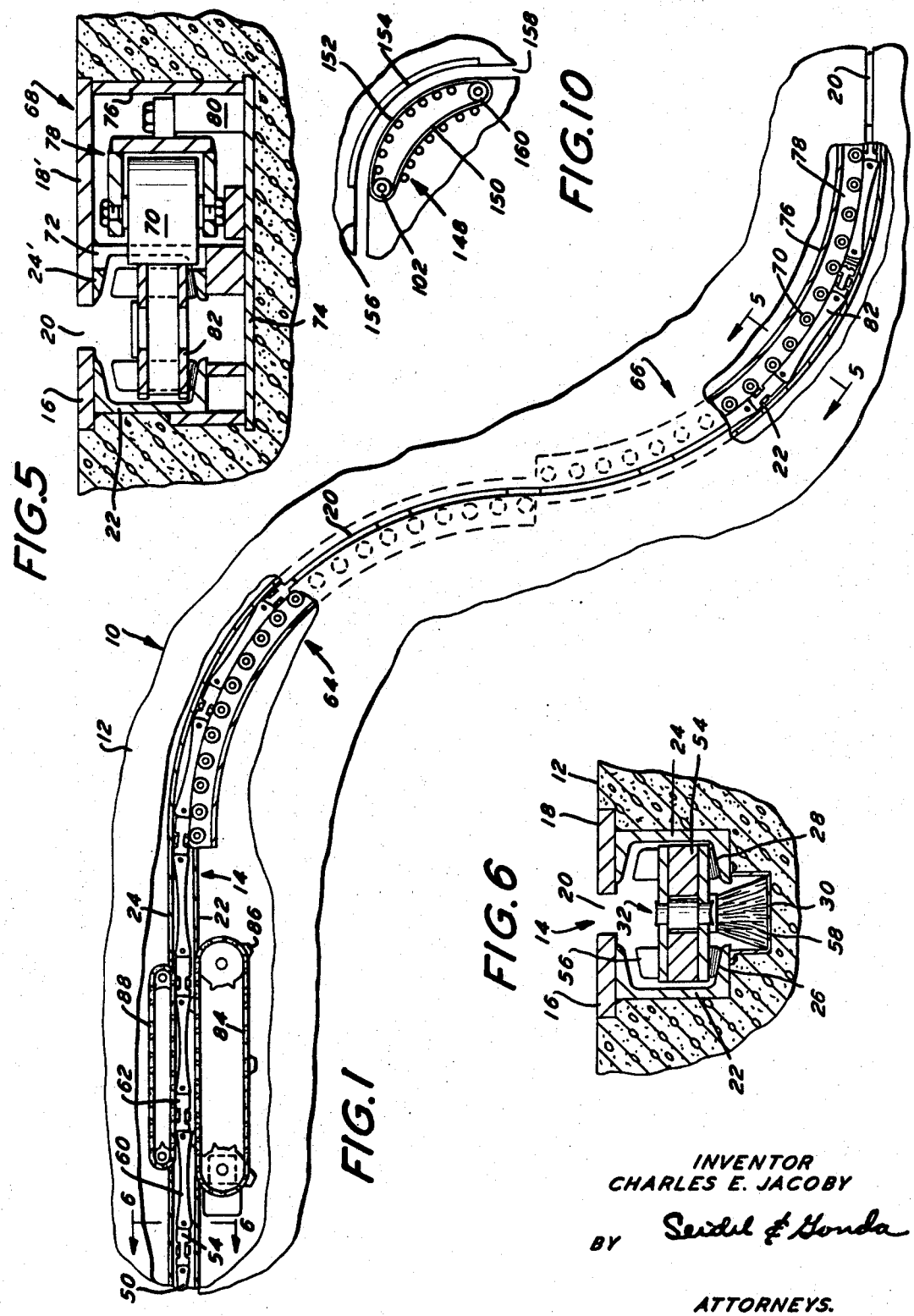

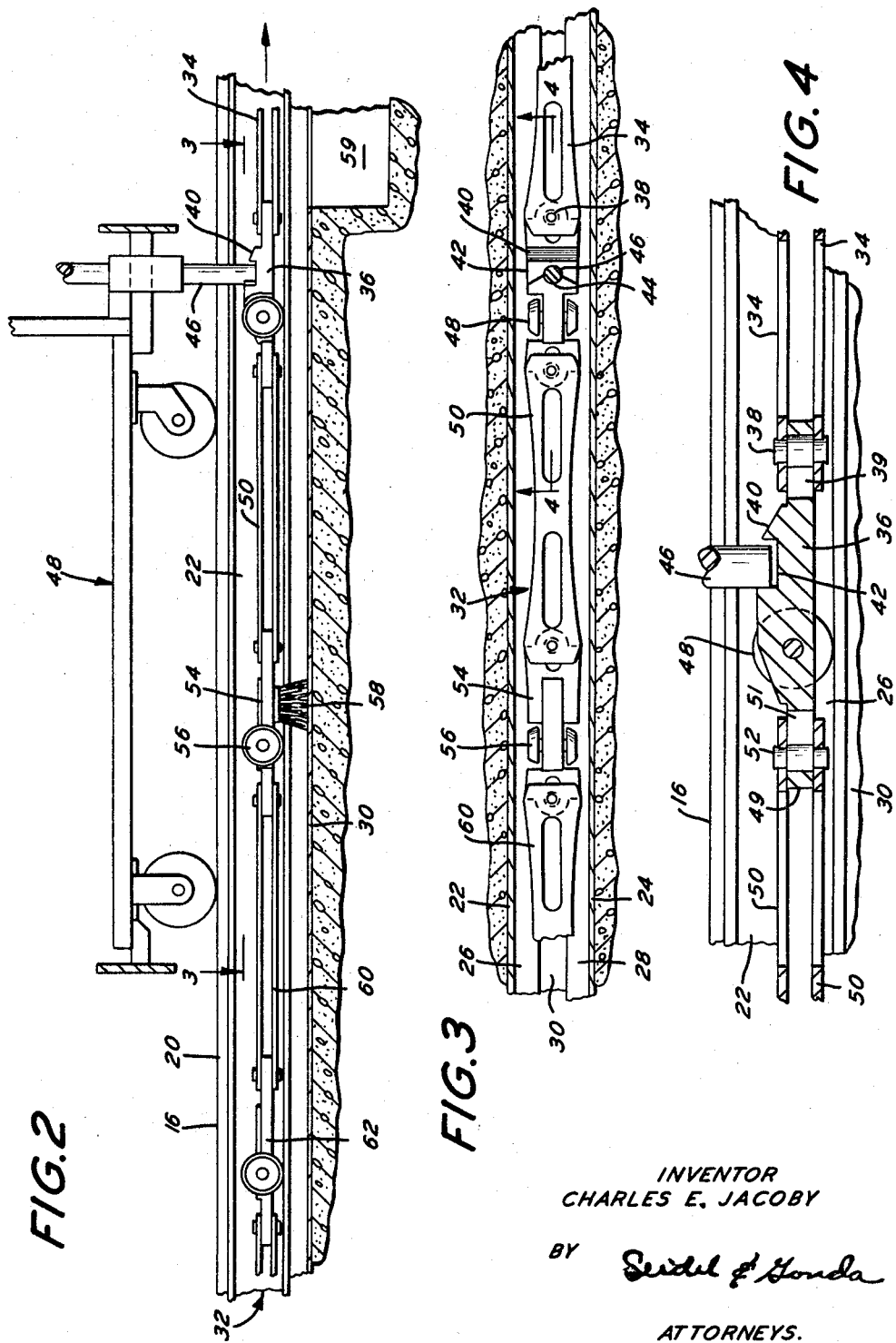

INVENTOR
CHARLES E. JACOBY

BY
Seidel & Gonda
ATTORNEYS

United States Patent Office 3,390,641
Patented July 2, 1968

3,390,641
TOW TRUCK CONVEYOR SYSTEM
Charles Edward Jacoby, Bethlehem, Pa., assignor to SI Handling Systems, Inc., Easton, Pa., a corporation of Pennsylvania
Filed Oct. 14, 1965, Ser. No. 495,912
5 Claims. (Cl. 104—172)

ABSTRACT OF THE DISCLOSURE

Conveyor system for moving wheeled vehicles is provided wherein a tow chain is provided with curved sides corresponding to the curvature of an arc of a track with an annular member between the conveyor chain and rollers at the track curve to minimize friction and provide for smooth negotiation of curves.

---

This invention relates to a tow truck conveyor system, and more particularly, to a conveyor system for moving wheeled vehicles or trucks on a reference surface along a main or shunt slot.

Tow truck conveyor systems in general are known to those skilled in the art. In this regard, reference is made to the following patents which disclose tow trucks and/or conveyor systems: 2,619,370; 3,126,838; 3,078,810; and Re. 25,723.

The tow truck conveyor system of the present invention is particularly directed to a system wherein two straight or parallel sections of the system are interconnected by a curved portion. The system includes a main slot through which a tow pin on a truck may extend with a track below the slot. A drag chain is supported by the track for movement therealong. The drag chain includes connecting links rotatably interconnected with pusher trolleys. The pusher trolleys have a pushing surface thereon for engagement with a tow pin for pushing the tow pin and its associated truck along the slot.

In accordance with the present invention, the trolleys and links have curved concave side edges corresponding to the radius of curvature of the curved portion of the system. In this manner, maximum support for the trolleys and links on the curved portions of the system may be provided. Also, the connecting links and trolleys may be made substantially longer than those proposed heretofore thereby reducing the number of joints and inherent cost of the chain. Also, wear of the chain at the joints is reduced since relative motion in the bearing area of the joint is minimized.

Large holes may be provided in the connecting links and/or trolleys to allow debris to fall through the main slot, track, connecting links, and trolleys into a trough under the track. This feature will minimize jamming of the conveyor system. A clean-out box or pit may be provided under the track at any desired location into which the debris may be pushed by brushes supported by the chain.

It is an object of the present invention to provide a novel tow truck conveyor system.

It is another object of the present invention to provide a tow truck conveyor system which has a drag chain structurally interrelated in a manner facilitating reduction of cost and wear at joints while permitting maximum support for the chain and its components.

It is another object of the present invention to provide a tow truck conveyor system structurally interrelated in a manner to facilitate minimum jamming of the conveyor by debris or other foreign matter.

Other objects will appear hereinafter.

FIGURE 1 is a partial plan view of the tow truck conveyor system of the present invention.

FIGURE 2 is a partial longitudinal sectional view of the system of the present invention.

FIGURE 3 is a sectional view taken along the line 3—3 in FIGURE 3.

FIGURE 4 is a sectional view taken along the line 4—4 in FIGURE 3.

FIGURE 5 is a sectional view taken along the line 5—5 in FIGURE 1.

FIGURE 6 is a sectional view taken along the line 6—6 in FIGURE 1.

FIGURE 10 is a partial plan view of another system.

Figure 7:
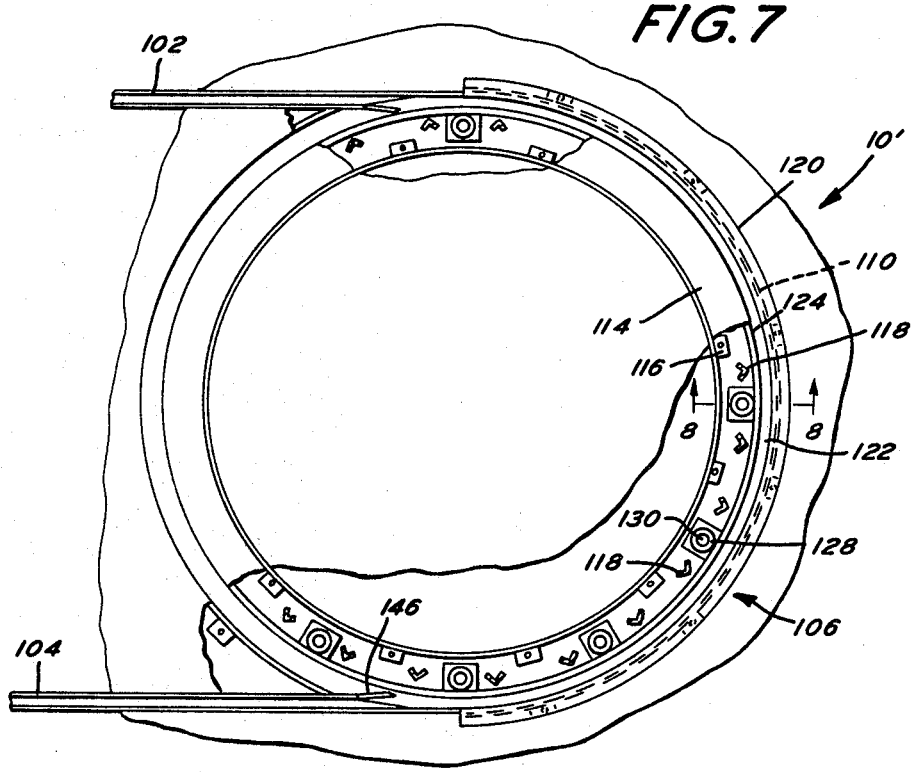
FIGURE 7 is a plan view of another system in accordance with the present invention illustrating the construction associated with making a 180° turn.

Referring to the drawing in detail, wherein like numerals indicate like elements, there is shown in FIGURE 1 a portion of a tow truck conveyor system in accordance with the present invention designated generally as 10. The system 10 includes a straight portion at the upper lefthand end of FIGURE 1 and a straight portion at the lower righthand end of FIGURE 1 interconnected by a curved portion. The straight portions of the system 10 may be parallel, perpendicular or angled with respect to each other.

The system 10 includes a reference surface such as a floor having mounted therein a track designated generally as 14. The track 14 may be mounted on the upper surface of floor 12 if desired. The track 14 includes a pair of horizontally disposed plates 16 and 18 spaced from one another to define a gap or main slot 20. The plates 16 and 18 have their upper surface flush with the floor 12.

The track 14 includes a C-shaped channel 22 secured in depending relation to the plate 16 and a C-shaped channel 24 secured in depending relation from plate 18. The open ends of the channels 22 and 24 are opposite one another. Channels 22 and 24 are provided with converging surfaces 26 and 28. A trough 30 is secured along its side edges to the bottom of the channels 22 and 24.

A chain designated generally as 32 is supported by the track 14 for movement therealong. The chain 32 includes pairs of connecting links 34 having one end rotatably connected to one end of a pusher trolley 36 as shown more clearly in FIGURE 2. In FIGURE 2, the chain 32 is moving from left to right. The connecting links 34 are substantially longer than the trolley 36.

The trolley 36 is provided with a nose portion disposed between the connecting links 34. A pin 38 is riveted in position so as to extend through the connecting links 34 and the nose portion on the trolley 36. The slot 39 is elongated in the direction of the chain 32. This feature facilitates slack accumulation in the chain. The connecting links 34 are rotatable with respect to the trolley 36 about the longitudinal axis of pin 38.

The riveting of pin 38 permanently secures the connector links 34 to the trolley 36. Preferably the length of the pin 38 is sufficient to allow flexing of the connecting links 34 with respect to the trolley 36 so that the chain 32 can negotiate vertically inclined curves.

The pusher trolley 36 includes at its forward end a beveled surface 40 in front of a recess 42. A pushing surface 44 in the form of a curved notch is contiguous with the recess 42 and adapted to contact the lower end of a tow pin 46. The pusher trolley 36 is provided with a pair of wheels 48 rotatably supported by the surfaces 26 and 28 on the track 14. The distance between juxtaposed surfaces on the wheels 48 is greater than the width of the slot 20 so as to preclude contact between the tow pin 46 and the wheels.

Connecting links 50 are rotatably connected to a tail portion on the pusher trolley 36 in the same manner as described above by means of a rivet pin 52. Pin 52 extends through an elongated slot 51 in the tail portion of the trolley 36. The trolley 36 terminates at its rear end in a pushing surface 49 disposed between the connecting links 50.

As shown more clearly in FIGURES 2, 3 and 6, an idler trolley 54 has its forward end rotatably connected to the ends of connecting links 50 remote from the pusher trolley 36. The idler and pusher trolleys are preferably of the same length. Idler trolley 54 is rotatably supported by a pair of wheels 56 which roll on the surfaces 26 and 28. The outer peripheral surface of the wheels 48 and the wheels 56 are tapered so as to correspond with the angle of convergence of the surfaces 26 and 28. In this manner, the trolleys will be more stable and will ride in a predetermined location along the track with little or no side movement with respect to the track.

A brush 58 may be supported in depending relation from the chain 32 at spaced points therealong. As illustrated in FIGURES 2 and 6, a brush 38 is supported in depending relation from the idler trolley 54. The brush 58 extends into the trough 30 for pushing debris or other foreign matter along the trough 30 to a clean-out pit 59. Pit 59 is disposed below the trough 30. Trough 30 is provided with a large aperture in that portion of its bottom wall disposed over the pit 59.

A pair of connecting links 60 have one end rotatably secured to a rear end of the idler trolley 54 in the same manner as described above. The other end of the connecting links 60 is similarly rotatably connected to the front end of a second idler trolley 62. Idler trolley 62 may be identical with idler trolley 50 except for the lack of a brush corresponding to brush 58. The above is deemed sufficient to illustrate the variations in the components of the chain 32. The number of idler trolleys is a matter of choice. The number of idler trolleys and connecting links generally greatly exceeds the number of pusher trolleys.

As illustrated, each of the connecting links is provided with elongated apertures through which debris may fall into the trough 30. If desired, the trolleys may likewise be provided with apertures or slots. The wheels on all of the trolleys are spaced apart for a sufficient distance so as to be remote from the area directly below the main slot 20. Each of the rotatable connections has large bearing surfaces for long life and sufficient play so as to facilitate negotiation by the chain 32 along inclined vertical surfaces. The elongated slots through which the pins extend at the joints between trolleys and connecting links maintain alignment while providing for slack downstream from the drive and the elimination of a need for a take-up system.

The straight sections of the system 10 as illustrated in FIGURE 1 are interconnected by curved portions 64 and 66 which are mirror images of one another. Hence, only curved portion 66 will be described in detail. The radius of curvature of the portions 64 and 66 is identical. Each of the trolleys and connecting links are provided with curved concave side edges having a radius of curvature corresponding to that of the curved portions 66. This feature permits maximum support of the links and trolleys when negotiating the curved portions 66 and enables the connecting links to be made much longer than those proposed heretofore. The increasing in the length of the links reduces the number of joints and hence the cost of the chain 32 is reduced. By way of example, the connecting links may have a length of 18 inches and the pusher trolleys may have a length of 10 inches when the radius of curvature of the portion 66 is approximately 72 inches.

As shown more clearly in FIGURES 1 and 5, the track 14 is provided with an extension housing 68 in the area of the curved portion 66. A plurality of rollers 70 are rotatably supported for rotation about a vertical axis at spaced points along the curved portion 66. The rollers 70 extend through slots 72 in the channel 24'. A base plate 74 is provided along the bottom of the track and housing 68. A plate 18', wider than plate 18, extends from the slot 20 to a side wall 76. Side wall 76 extends between the plate 18' and the base plate 74.

As shown more clearly at the righthand end of FIGURE 1, the various plates and track sections are curved so as to be parallel to one another. The various rollers 70 are rotatably supported by the parallel arms of a U-shaped channel 78. The base portion of the channel 78 is supported by a mounting block 80.

It will be noted that the connecting links 82 and the trolleys negotiate the curved portions 66 in a much smoother manner since they are constantly in contact with a substantial number of the rollers 70. The rollers 70 cooperate with the wheels of the trolleys at the opposite ends of the connecting links to provide three point support for the connecting links, thereby overcoming problems of beam strength of long links and other design considerations.

A drive means is provided to drive the chain 32. As illustrated at the lefthand end in FIGURE 1, the drive means may include an endless chain 84 extending around a pair of sprockets, one of which is driven. Cogs 86 are provided on the chain 84 at spaced points therealong. The cogs 86 are positioned so that they pass between upper and lower links and engage the pushing surface 49 on the pusher trolleys 36. The distance between adjacent cogs 86 on the chain 84 may correspond to the distance between adjacent trolleys or adjacent pusher trolleys as desired.

In view of the state of the art relating to tow truck conveyor systems, a detailed description of the same is not deemed necessary. When a tow pin 46 on a truck 48 is positioned so that it extends through the slot 20, the next pusher trolley of the chain 32 will engage with the same and move the truck 48 along the main slot 22. The beveled surface 40 will cause the lower end of the tow pin 46 to move upwardly a short distance and then drop into the slot 42. As shown more clearly in FIGURE 3, the sides of the trolley 46 are tapered away from the pushing surface 44.

Figure 8:
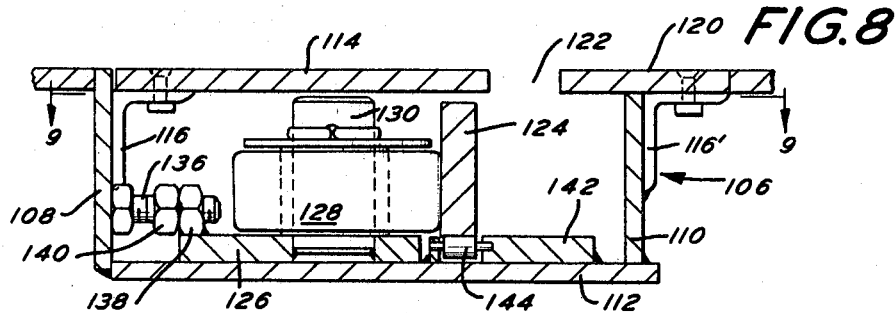
FIGURE 8 is a sectional view taken along line 8—8 in FIGURE 7.
Figure 9:
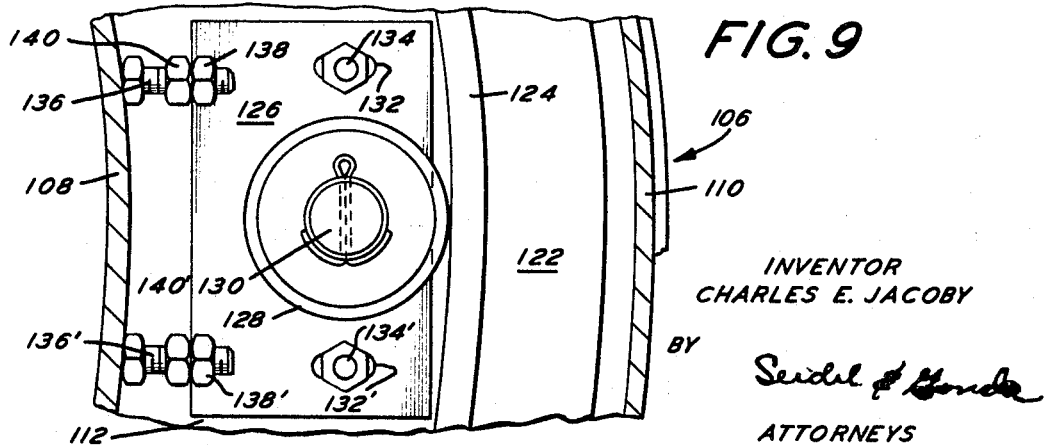
FIGURE 9 is an enlarged detail plan view taken along the line 9—9 in FIGURE 8.

In FIGURES 7-9, there is illustrated another embodiment of the tow truck conveyor system of the present invention designated generally as 10'. The system 10' is particularly adapted for use when the straight sections of the system are parallel to one another and the curved portion of the system interconnecting the straight sections is semi-circular.

The system 10' includes straight sections 102 and 104 interconnected by a semi-circular curved section 106. The curved section 106 includes an inner annular wall 108 and an outer annular wall 110. The diameter of wall 110 is substantially greater than the diameter of wall 108. The walls 108 and 110 are upright and fixed to a bottom wall 112 which is horizontally disposed.

A top plate 114, shown only in FIGURE 8, is supported by the wall 108 by means of brackets 116 at spaced points therealong. Wall 114 is a flat horizontally disposed ring-shaped plate spaced from and parallel to the bottom wall 112. Angle iron posts 118 may be provided to extend between the bottom wall 112 and the top wall 114 to support the latter adjacent its outer periphery.

A top plate 120 is supported by the outer wall 110 and brackets 116 at spaced points around the periphery of wall 110. Top plate 120 is spaced radially outwardly from the top wall 114 thereby defining the main slot 122. Main slot 122 corresponds to slot 20 of system 10.

A ring 124 is provided in the system 10' below the top wall 114 adjacent the outer periphery thereof. The center of ring 124 corresponds to the center of curvature of the curved section 106. A flat base plate 126 is provided on the upper surface of bottom plate 112 at spaced points therealong. A roller 128 is rotatably supported by a pin 130. Pin 130 is secured to base plate 126 and supports the roller 128 for rotation about an upright axis.

As shown more clearly in FIGURE 9, the plate 126 is provided with elongated slots 132 and 132' on opposite sides of pin 130. A bolt 134 extends through slot 132 and is threaded to plate 126. A bolt 134' extends through slot 132' and is threaded to plate 126.

Nuts 138 and 138' are fixedly secured to the plate 126 in any convenient manner such as by welding. A bolt 136 is threadedly secured to nut 138. A bolt 136' is threadedly secured to bolt 138'. A lock nut 140 is provided on bolt 136. A lock nut 140' is provided on bolt 136'. The above elements designated by the numerals 132–140 and 132'–140' facilitate adjustment of the roller 128 toward and away from the inner peripheral surface of the ring 124.

A track 142 is supported below the main slot 122. The track 142 assists in supporting rollers 144 at spaced points therealong and on which the ring 124 rides. The rollers 144 need only be positioned approximately 60° apart. If desired, the track 142 may have beveled surfaces corresponding to surfaces 26 and 28 in FIGURE 6.

The operation of system 10' is as follows:

The system 10' is adapted to be mounted in a reference surface such as a floor or the like as described above in connection with system 10. The conveyor chain, such as that illustrated in connection with FIGURES 1–6, will be constructed so that the side edges of the links and trolleys juxtaposed to ring 124 will have a radius of curvature corresponding to the radius of ring 124. The links and trolleys will engage the ring 124 and cause the same to turn on rollers 144 while in rolling engagement with rollers 128. The use of ring 124 enables the number of rollers 128 to be substantially lower than the number of rollers which ordinarily would have been required had the curved section been constructed in accordance with the structure illustrated in FIGURE 5 wherein the distance between rollers is less than the length of the trolleys. Section 104 is provided with an extension 146 so that the conveyor chain will enter section 104 and lose contact with the ring 124.

It will be appreciated by those skilled in the art that an annular reinforced flexible belt 148 may be substituted for the ring 124. When a belt 148 is used in place of ring 124 as shown in FIGURE 10, the length of the belt may be shorter than the periphery of ring 124 and lighter in weight than ring 124. The belt 148 may be shorter due to the fact that it need not be supported in the form of a circle but may instead have a variety of shapes resulting in the ability of using a smaller turn housing in the floor. For example, a flexible belt 148 may be supported in the form of a crescent with the inner run 150 of the belt being substantially parallel to the outer run 152 of the belt. The center of curvature of run 152 corresponds to the center of curvature for curved section 154 which interconnects straight sections 156 and 158.

Rollers engage the inner and outer periphery of belt 148. Belt 148 is preferably supported by idler pulleys 160 and 162. Sag in the belt 148 between pulleys 160 and 162 may be prevented by providing flanges on the rollers above and below the belt. Pulley 160 is adjustable for tensioning the belt 148. Belt 148 may be made from rubber reinforced with fabric or glass fibers. Otherwise, the embodiment in FIGURE 10 is identical with systems 10 and 10'.

When using either a ring such as ring 124 or a flexible belt, it will be appreciated by those skilled in the art that the straight sections of the system may be perpendicular to each other as in FIGURE 10 or at any angle between 90 and 180° with respect to each other. Either system 10 or 10' could be utilized with a conveyor chain having wheels for the trolleys or a conveyor chain that does not have wheels for the trolleys but rather a wear-plate.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a tow truck conveyor system having a curved portion connected to a straight portion, each portion having a main slot through which a tow pin on a truck may extend, each portion having a track adjacent the main slot, a plurality of spaced rollers mounted for rotation about an upright axis and disposed below the level of the slot, the axis of rotation of said rollers defining an arc having its center of curvature corresponding to the center of curvature of the curved portion, the track of the curved portion being adjacent said rollers and being curved so as to correspond to the curvature of said arc, at least a substantial portion of the periphery of said rollers being between the level of the track and the level of the slot so that the rollers may support sides of a conveyor negotiating the curved portion, and an annular member above the track and having its inner periphery in rolling engagement with the outer periphery of the rollers so as to be disposed between the rollers and concave side edges of the conveyor to be supported by the track.

2. Apparatus in accordance with claim 1 wherein said annular member is a rigid rotatable ring, the axis of rotation of the ring corresponding to the axis of said arc.

3. Apparatus in accordance with claim 1 wherein said annular member is a flexible belt and at least one roller engaging the outer periphery of said belt.

4. Apparatus in accordance with claim 1 including a conveyor in said track, said conveyor being comprised of links, a side periphery of the links being curved with the radius of curvature corresponding to the curvature of said arc.

5. A subcombination for use in a tow truck conveying system comprising a chain, said chain including links rotatably interconnected with trolleys, each trolley having a pair of wheels for rolling engagement with the track, some of the trolleys having a pushing surface thereon for engagement with a tow pin, said trolleys and links having a curved concave side edge, with the radius of curvature of said edges being the same and adapted to correspond to the radius of curvature of a curve in a system in which the chain is to be used, riveted joints between connecting links and trolleys, said joints having sufficient play so that the chain can negotiate vertically inclined curves, and said trolleys having wheels, the wheels having peripheral surfaces converging in an outward direction, with the wheels being closer together than the transverse distance across the trolley at the location where the wheels are supported so that the wheels will not interfere with rollers in rolling engagement with the periphery of the trolleys when the trolleys negotiate curves in a track.

References Cited

UNITED STATES PATENTS

| 382,575 | 5/1888 | Weston | 104—172 |
| 1,407,673 | 2/1922 | Rue | 104—172 |
| 2,965,043 | 12/1960 | Klamp | 104—172 |
| 3,255,710 | 6/1966 | Bradshaw | 104—162 |

ARTHUR L. LA POINT, *Primary Examiner.*

D. F. WORTH, *Assistant Examiner.*